United States Patent Office 3,108,038
Patented Oct. 22, 1963

3,108,038
ANILIDE NEMATOCIDES
Max J. Fielding, Wilmington, Del., and David L. Stoddard, Avondale, Pa., assignors to E. I. du Pont de Nemours and Company, Wilmington, Del., a corporation of Delaware
No Drawing. Filed Jan. 8, 1962, Ser. No. 164,995
1 Claim. (Cl. 167—30)

This invention relates to compositions and methods for the control of plant pathogenic nematodes employing as essential active ingredients certain acyl anilides of the kind more particularly described below.

Nematodes are round worms which infest soil and attack virtually all cultivated plants throughout the entire world. Plants infected by pathogenic nematodes present a weakened, sick appearance. The roots of such plants display a stunted appearance, numerous galls, knots or lesions, and various other manifestations depending upon the nature of the plant and the specific type of nematode involved. Often the entire plant has the appearance of being nutritionally deficient.

Methods and compositions for the control of nematodes heretofore known have usually been either inconvenient to use or too expensive for widespread application. Many such nematocides are highly injurious not only to man and animals, but also to plants and seeds. It has now been found that the disadvantages of the prior art compositions and methods can be avoided by treating soil infested with nematodes with one or more compounds selected from the general formula:

(1) 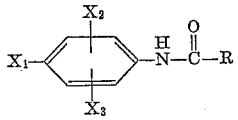

where
$X_1$ is halogen or nitro;
$X_2$ is hydrogen or alkyl of less than 5 carbon atoms;
$X_3$ is halogen; and
R is hydrogen, unsubstituted alkyl of 1–5 carbon atoms, or unsubstituted alkenyl of 2–5 carbon atoms.

Preferred compounds within the scope of Formula 1 are those where $X_1$ is chlorine;
$X_2$ is hydrogen or methyl;
$X_3$ is chlorine; and
R is hydrogen, unsubstituted alkyl of 1–5 carbon atoms, or unsubstituted alkenyl of 2–5 carbon atoms.

The compounds to be used according to this invention can be prepared conveniently by reacting a properly substituted aniline with a given acid halide as illustrated by the following equation:

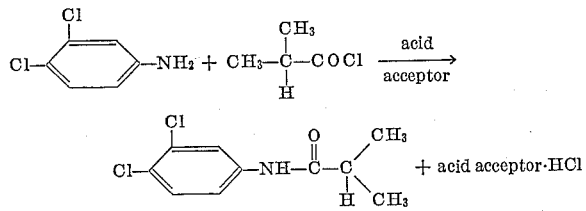

Generally, the acid halide is added gradually with stirring at room temperature to an inert solvent such as toluene, benzene, or dioxane containing an acid acceptor such as triethyl amine, pyridine, or sodium carbonate, and the properly substituted aniline. To insure complete interaction the entire reaction is heated briefly at 75° C. to 100° C. Essentially pure acyl anilide product can be obtained by distilling off the solvent, and washing the residue with water until free of the acid acceptor salt.

In use these compounds can be applied to areas to be protected from nematodes in any of a variety of compositions. Thus, those that are sufficiently water-soluble can be applied simply as water solutions. It is preferred, however, that the compounds be extended with a carrier material or conditioning agent of the kind used and commonly referred to in the art as an adjuvant or modifier. Such adjuvants are inert solids, surface-active agents and organic liquids.

These compounds shown above will be included in such compositions in sufficient amount so that they can exert a nematocidal effect. Usually from about 1 to 95% by weight of the compounds are included in such formulations.

Solid formulations can be prepared with inert powders. The formulations thus can be homogeneous powders that either can be used as such, diluted with inert solids to form dusts, or suspended in a suitable liquid medium for spray application.

The powders usually comprise active ingredient admixed with minor amounts of conditioning agent. Natural clays (either absorptive such as attapulgite or relatively non-absorptive such as china clays), diatomaceous earth, walnut shell flour, redwood flour, synthetic fine silica, calcium silicate and other inert solid carriers of the kind conventionally employed in powder fungicidal compositions can be used. Industrial fertilizers and even dry soil can sometimes be used.

The active ingredient usually makes up from about 1–95% by weight of these powder compositions. The solids ordinarily should be very finely divided and should have a particle size below about 50 microns and preferably below about 20 microns. For conversion of the powders to dust formulations, talc, pyrophyllite, tobacco dust, volcanic ash and other dense, rapid-settling inert solids customarily are used.

If the active compound used is water soluble, it can be sprayed or in any other desired manner applied to an absorptive powder which can then be dried to produce a dry product. Any of the above absorptive materials can be used for the preparation of such products.

Liquid compositions including the active compounds above described can be prepared by admixing the compound with a suitable liquid diluent medium. The active compound can be either in solution or in suspension in the liquid medium. Typical of the liquid media commonly employed are kerosene, Stoddard solvent, xylene, alcohols, alkylated naphthalene, diesel oil, glycols and ketones such as diisobutyl ketone, cyclohexanone, etc. Stoddard solvent, as is well known in the art, is a petroleum distillate characterized in a distillation test by not less than 50% being received by 350° F., not less than 90% being received by 375° F., and the end point not being over 410° F. It is further defined in "Encyclopedia of Chemical Technology," edited by R. E. Kirk and D. F. Othmer, volume 5, p. 216. The active ingredient usually makes up from about 0.5 to 50% of these liquid compositions. Some of these compositions are designed to be used as such, and others to be extended or emulsified with large quantities of water.

Nematocidal compositions in the form of wettable powders or liquids can also include one or more surface-active agents such as wetting, dispersing, or emulsifying agents. Thus mixtures of the above liquids with the active compounds can contain an emulsifying agent to make an emulsifiable oil composition. The surface-active agents cause the compositions to disperse or emulsify easily in water to give aqueous sprays. Generally the surface-active agents will not comprise more than 5 to 10% by weight of a composition and in some compositions the percentage will be considerably less than 1%.

The surface-active agents employed can be of the anionic, cationic, or nonionic type. They include for example, sodium oleate, sulfonated petroleum oils, alkyl aryl sulfonates, sodium lauryl sulfate, polyethylene oxides, lignin sulfonates, and other surface-active agents. A detailed list of such agents is set forth in an article by McCutcheon in "Soap and Chemical Specialties," volume 31, No. 7, pages 50–61; No. 8, pages 48–61; No. 9, pages 52–67; and No. 10, pages 48–67 (1955). See also McCutcheon in "Chemical Industries," November 1947, page 811, entitled "Synthetic Detergents"; and Bulletin E–607 of the Bureau of Entomology and Plant Quarantine of the U.S. Department of Agriculture.

In general, the nematocidal compositions are applied to cultivated land and mixed with top soil. The active compound or compounds present in the compositions are applied in an amount sufficient to exert the desired nematocidal action. The exact dosage necessary is, of course, dependent upon the particular active ingredient or ingredients employed, the nature of the formulation used, the type of treament, the type and quantity of nematodes to be controlled, duration of treatment desired, climatic conditions and the like.

As a practical matter, application rates of from 1 to 50 pounds per treated acre generally are satisfactory for nematode control, although larger rates can be used.

After application, the compounds are preferably worked into the ground to the depth of 4 to 6 inches.

In the examples hereinafter given, representative nematocidal compounds within the scope of Formula 1 are shown used in various ways to control nematodes.

Because of the phytotoxicity of the compositions of this invention, care must be used when they are applied to soil after the emergence of a crop so that no plants are damaged.

In order that the invention may be better understood, reference should be had to the following additional illustrative examples.

*Example 1*

The following suitable powder nematocidal compositions are prepared by the conventional technique of first blending active ingredient with inert powder carrier, wetting agent, and dispersant, and then grinding the mixture in an impact mill to an average particle size below about 50 microns. This mixture is next reblended until completely homogeneous.

| | Parts |
|---|---|
| 3′,4′-dichloroformanilide | 75.00 |
| Sodium salt of alkylated naphthalene sulfonic acid | 1.75 |
| Methyl cellulose, low viscosity | 0.25 |
| Disodium phosphate | 2.00 |
| Attapulgite clay | 21.00 |

These powder formulations, when dispersed in water, are applied witeh conventional spray equipment at a spray concentration of about 5 pounds wettable powder per 10 gallons of water at a rate between 10 and 100 pounds active ingredients per acre of land infested with pathogenic nematodes. The chemical is then worked into the soil. When soil known to be infested with root knot nematodes (*Meloidogyne spp.*) is treated with 50 pounds of active agent per acre, then cucumbers grown in this soil show normal development free from nematode infection.

*Example 2*

The following aqueous suspension compositions are prepared by mixing the active ingredient with the other ingredients listed, and then wet milling the mixture. The resulting liquid is a thixotropic suspension in which the active nematocidal ingredient does not settle out to a hard cake during storage.

| | Parts |
|---|---|
| 2′,4′-dichloropropionanilide | 30 |
| Sodium lignosulfonate (composition) | 15 |
| Florida fuller's earth (hydrated attapulgite) | 1.5 |
| Low viscosity methyl cellulose | 0.5 |
| Disodium phosphate | 0.9 |
| n-Octyl alcohol | 0.1 |
| Water | 52.0 |

Upon mixing these suspensions with water, substantially non-flocculated aqueous dispersions are obtained which can be applied from conventional spray equipment. These dispersions are applied full strength to land known to be infested with the sugar beet nematode (*Heterodera schacteii*) at a rate of 10 to 50 pounds of active agent per acre. Substantially complete control is demonstrated by an examination of sugar beet roots from plants grown in this soil.

*Example 3*

The following emulsifiable oil compositions are prepared by blending active ingredient, wetting agent and oils together until a completely homogeneous mixture is obtained.

(A)

| | Parts |
|---|---|
| 3′,4′-dichloropropionanilide | 30 |
| Blend of poly-alcohol carboxylic esters and oil-soluble sulfonates | 7 |
| Stoddard solvent | 63 |

(B)

| | |
|---|---|
| 3′,4′-dichloro-2-methylacrylanilide | 35 |
| Polyoxyethylene sorbitan trioleate | 10 |
| Stoddard solvent | 55 |

(C)

| | |
|---|---|
| 3′,4′-dichloro-2-methylvaleranilide | 33 |
| Polyoxyethylene 400 dioleate | 8 |
| Stoddard solvent | 55 |

(D)

| | |
|---|---|
| 3′,4′-dichloro-2-methylbutyranilide | 40 |
| Polyoxyethylene lauryl ether | 10 |
| Stoddard solvent | 50 |

These compositions, when poured into water, disperse into an emulsion suitable for application as a spray. When diluted at the rate of 1 part composition to 4 parts water and applied at the rate of 30 gallons of active ingredient per acre to soil known to be infested with root knot nematodes (*Meloidogyne* spp.) tomato plants grown in this soil show normal development free from nematode infection.

*Example 4*

The following dust nemotocidal compositions are prepared by first blending together the active ingredient with the minor diluent and micropulverizing the mix to an average particle size less than 50 microns. This resulting mixture is then blended with the major diluent to yield a composition suitable for use with ordinary dusting equipment.

(A)

| | Parts |
|---|---|
| 3′,4′-dichlorohexanilide | 15 |
| Diatomaceous silica | 15 |
| Pyrophyllite | 68 |
| Lauryl alcohol | 2 |

(B)

| | |
|---|---|
| 3′,4′-dichloroacrylanilide | 10 |
| Fine silica | 15 |
| Micaceous talc | 73 |
| Lauryl alcohol | 2 |

(C)

| | Parts |
|---|---|
| 3',4'-dichlorobutyranilide | 20 |
| Kaolin clay | 20 |
| Tobacco dust | 58 |
| Lauryl alcohol | 2 |

(D)

| | |
|---|---|
| 3',4'-dichlorocrotonanilide | 15 |
| Diatomaceous silica | 15 |
| Pyrophyllite | 68 |
| Lauryl alcohol | 2 |

These compositions when applied to the soil at the rate of 5 to 100 pounds per acre of active ingredient using standard dusting equipment provides excellent control of stubby root nematodes (*Trichodorus* spp.) in corn.

*Example 5*

The following composition is prepared by first micro-pulverizing the active ingredient, suspending it in excess water with the gum arabic and mixing it with the vermiculite in a spray blender. When dry, the active ingredient is firmly attached and evenly distributed through the vermiculite to yield a free-flowing, granular composition suitable for application with a fertilizer spreader.

| | Parts |
|---|---|
| 3',4'-dichloropivalanilide | 10 |
| Ground vermiculite (No. 4 granules) | 85 |
| Gum arabic | 5 |

This granular composition when applied at the rate of 300 pounds per acre provides good control of nematodes in growing cotton plants.

*Example 6*

Topsoil is treated with active agents of the present invention as follows:

A. Powdered 3'-chloro-4'-methylpropionanilide of particle size below 50 microns in diameter is mixed at the rate of 50 pounds per acre with garden soil known to be heavily infested with the root knot nematode (*Meloidogyne incognita*). Cucumber seeds are planted in both treated and untreated soil. Following germination, the plants are allowed to grow until the first true leaf appears. Then the plants are removed from the soil and the roots examined for root knot. Plants grown in the treated soil have no knots on their roots. Plants grown in untreated soil are 100% infected.

B. Powdered 3',4'-dichloroisobutyranilide of particle size below 50 microns in diameter is mixed at the rate of 33 pounds per acre with garden soil infested with approximately 2600 parasitic nematodes (various species including *Meloidogyne* spp.) per pint of soil. Cucumbers grown in this soil show normal, healthy development. Cucumbers grown in similar untreated soil exhibit the characteristics of plants infested with nematodes.

C. Powdered 3',4'-dichloro-2'-methylformanilide of particle size below 50 microns in diameter is mixed at the rate of 33 pounds per acre with garden soil infested with approximately 2600 parasitic nematodes (various species including *Meloidogyne* spp.) per pint of soil. When grown in this soil, watermelons, which would normally be heavy infected, showed normal, healthy development.

*Example 7*

In this example, the recommended application rate is 5 to 50 pounds per acre for each nematocide. This application rate is sufficient to control nematodes provided the active agent is applied using conventional carriers and application methods such as are described and recommended in this specification. Each nematocide can be formulated as described in Examples 1, 4, 5, and 6 (contingent with its physical properties) by substituting such nematocide in the same amount for the nematocide used in the formulations given in the foregoing examples.

3',4'-dichloro-2'-methylacetanilide
2'-chloro-4'-nitro-6'-methylpropionanilide
3',4-dichloroacetanilide
3',4-dichloroformanilide
3',4'-dibromoacetanilide
2',4'-dichloropropionanilide
3',4'-difluorobutyranilide
3',4'-dichloro-6'-methylisobutyranilide
2',4'-dichlorocaproanilide
3'-chloro-4'-nitropivalanilide
3'-chloro-4'-bromopropionanilide
3'-fluoro-4'-nitroformanilide
3',4'-dichloro-2'-methylacetanilide
2'-chloro-4'-nitrocrotonanilide
3',4'-dichloro-6'-ethylcrotonanilide
3',4'-dichloro-2'-methylcrotonanilide
3',4'-dichloro-2'-methylvalveranilide
3',4'-dichloro-2,2'-dimethylacrylanilide
3',4'-dichloro-2,2'-dimethylvaleranilide
2',4'-dichloro-4,5'-dimethylcrotonanilide
3',4'-dichloro-6'-methylpropionanilide
3',4'-dibromo-6'-isobutylpropionanilide
3'-chloro-4'-nitropropionanilide
2',4'-diiodo-4-methylcrotonanilide This application is a continuation-in-part of applications Serial Nos. 670,637, filed July 9, 1957; 700,283, filed December 3, 1957; and 6,374, filed February 3, 1960, all now abandoned.

The embodiments of the invention in which an exclusive property or privilege is claimed are:

A method for the control of nematodes in soil, said method comprising applying to said soil a nematocidal amount of a compound having the formula

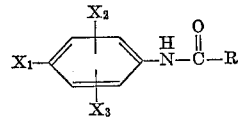

where

X₁ is selected from the group consisting of halogen and nitro;
X₂ is selected from the group consisting of hydrogen and alkyl radicals of less than 5 carbon atoms;
X₃ is halogen; and
R is selected from the group consisting of hydrogen, unsubstituted alkyl radicals of 1–5 carbon atoms and unsubstituted alkenyl radicals of from 2–5 carbon atoms.

References Cited in the file of this patent

UNITED STATES PATENTS 2,957,800    Hopkins      Oct. 25, 1960

OTHER REFERENCES

King: U.S. Department of Agriculture, Handbook No. 69, May 1954, pages 25, 105, 175, and 285.